(12) United States Patent
Yamamoto et al.

(10) Patent No.: US 12,463,513 B2
(45) Date of Patent: Nov. 4, 2025

(54) METHOD FOR MANUFACTURING COMPRESSOR

(71) Applicant: DAIKIN INDUSTRIES, LTD., Osaka (JP)

(72) Inventors: Satoshi Yamamoto, Osaka (JP); Masatoshi Itou, Osaka (JP); Takahiro Imai, Osaka (JP); Shoujirou Naka, Osaka (JP); Daisuke Hiratsuka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 114 days.

(21) Appl. No.: 18/440,192

(22) Filed: Feb. 13, 2024

(65) Prior Publication Data

US 2024/0186870 A1    Jun. 6, 2024

Related U.S. Application Data

(63) Continuation of application No. PCT/JP2022/022357, filed on Jun. 1, 2022.

(30) Foreign Application Priority Data

Aug. 17, 2021 (JP) ................. 2021-132637

(51) Int. Cl.
*H02K 15/12* (2025.01)
*H02K 1/18* (2006.01)

(52) U.S. Cl.
CPC .............. *H02K 15/12* (2013.01); *H02K 1/18* (2013.01)

(58) Field of Classification Search
CPC ........ H02K 1/18; H02K 15/12; H02K 15/121; H02K 15/122; H02K 15/123
See application file for complete search history.

(56) References Cited

U.S. PATENT DOCUMENTS

| | | | |
|---|---|---|---|
| 2001/0038797 A1 | 11/2001 | Makino et al. | |
| 2022/0216775 A1 | 7/2022 | Naka et al. | |
| 2024/0014698 A1* | 1/2024 | Hiratsuka | H02K 1/185 |

FOREIGN PATENT DOCUMENTS

| | | |
|---|---|---|
| JP | 2001-289173 A | 10/2001 |
| JP | 2021-58082 A | 4/2021 |

OTHER PUBLICATIONS

International Preliminary Report of corresponding PCT Application No. PCT/JP2022/022209 dated Feb. 29, 2024.

(Continued)

*Primary Examiner* — Alison L Hindenlang
*Assistant Examiner* — Alexander A Wang
(74) *Attorney, Agent, or Firm* — GLOBAL IP COUNSELORS, LLP

(57) ABSTRACT

A method for manufacturing a compressor includes fixing a stator core to an inside of a barrel via a resin member by shrink fit. An outer peripheral surface of the resin member is a first joining surface. A surface in contact with the first joining surface on an inner peripheral surface of the barrel is a second joining surface. The fixing the stator core to the inside of the barrel includes joining the first joining surface to the second joining surface. Upon joining, to the second joining surface, an intermediate portion of the first joining surface between a first end and a second end facing each other, spaces between the first joining surface and the second joining surface are formed between the first end and the intermediate portion and between the second end and the intermediate portion.

10 Claims, 12 Drawing Sheets

(56) References Cited

OTHER PUBLICATIONS

1 International Search Report of corresponding PCT Application No. PCT/JP2022/022357 dated Aug. 23, 2022.
European Search Report of corresponding EP Application No. 22 85 8135.1 dated Oct. 7, 2024.

* cited by examiner

INSERT MOLDING

HEATING

JOINING

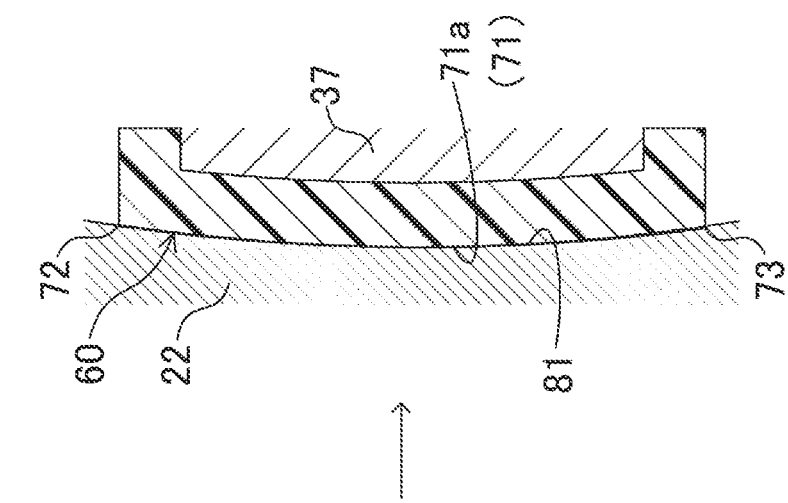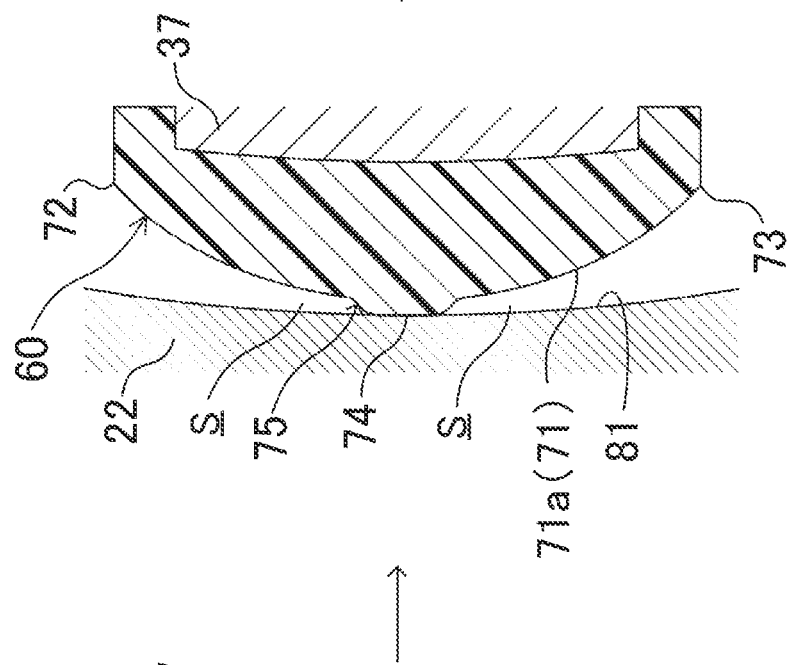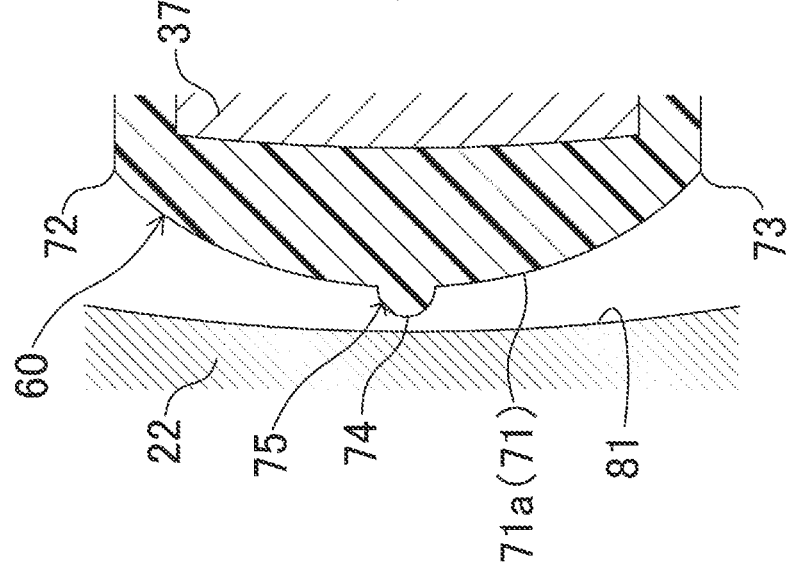

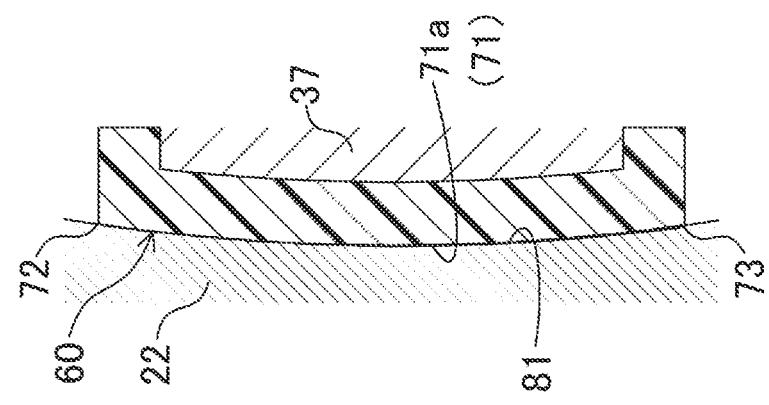
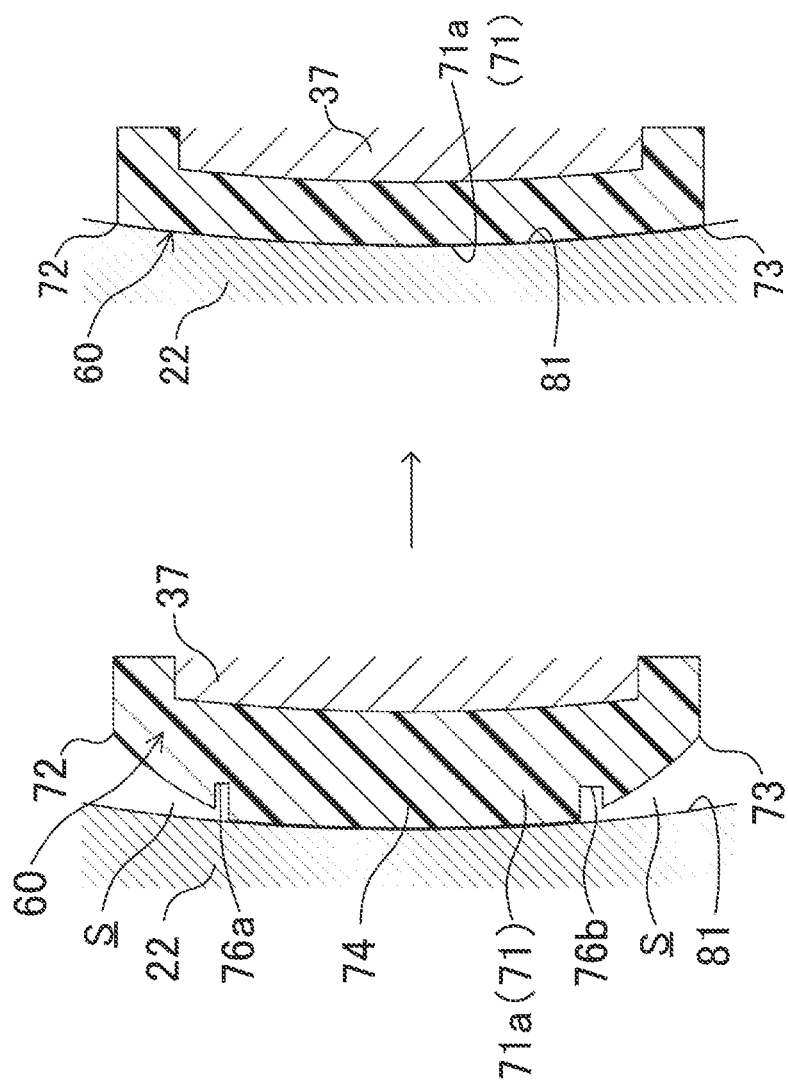
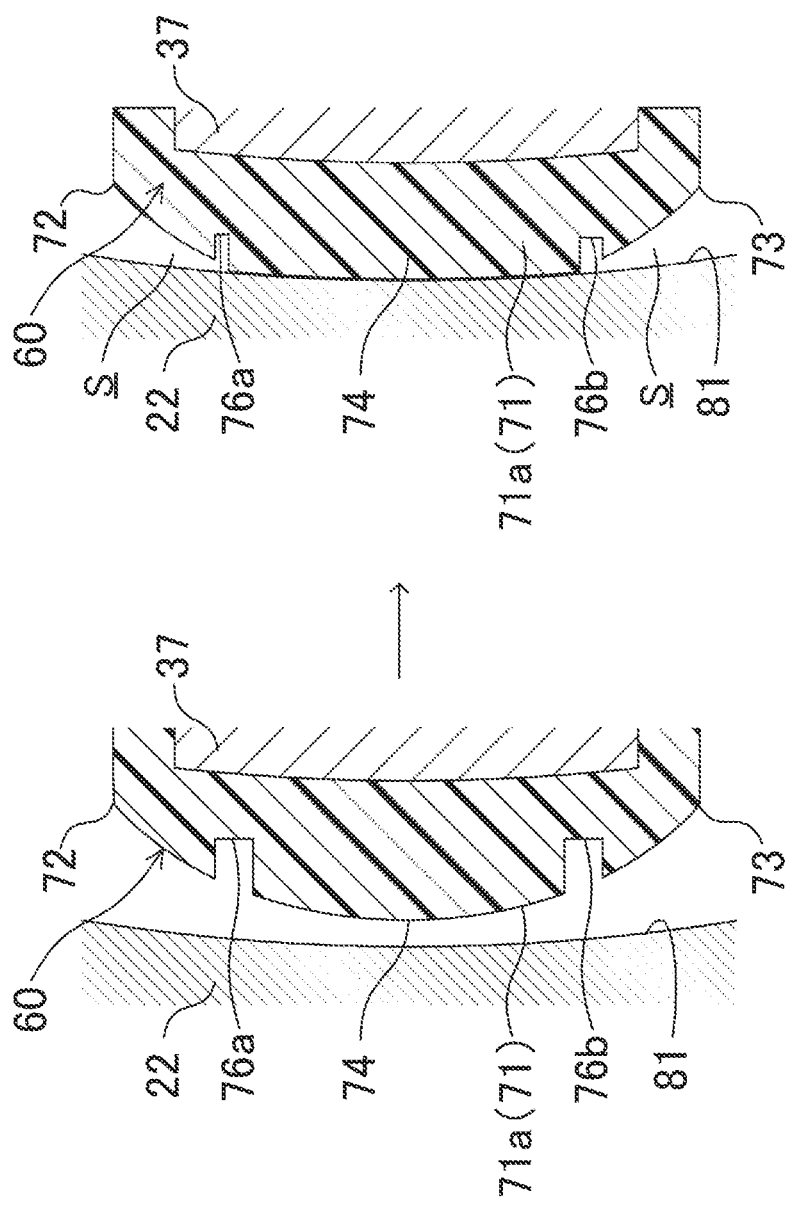

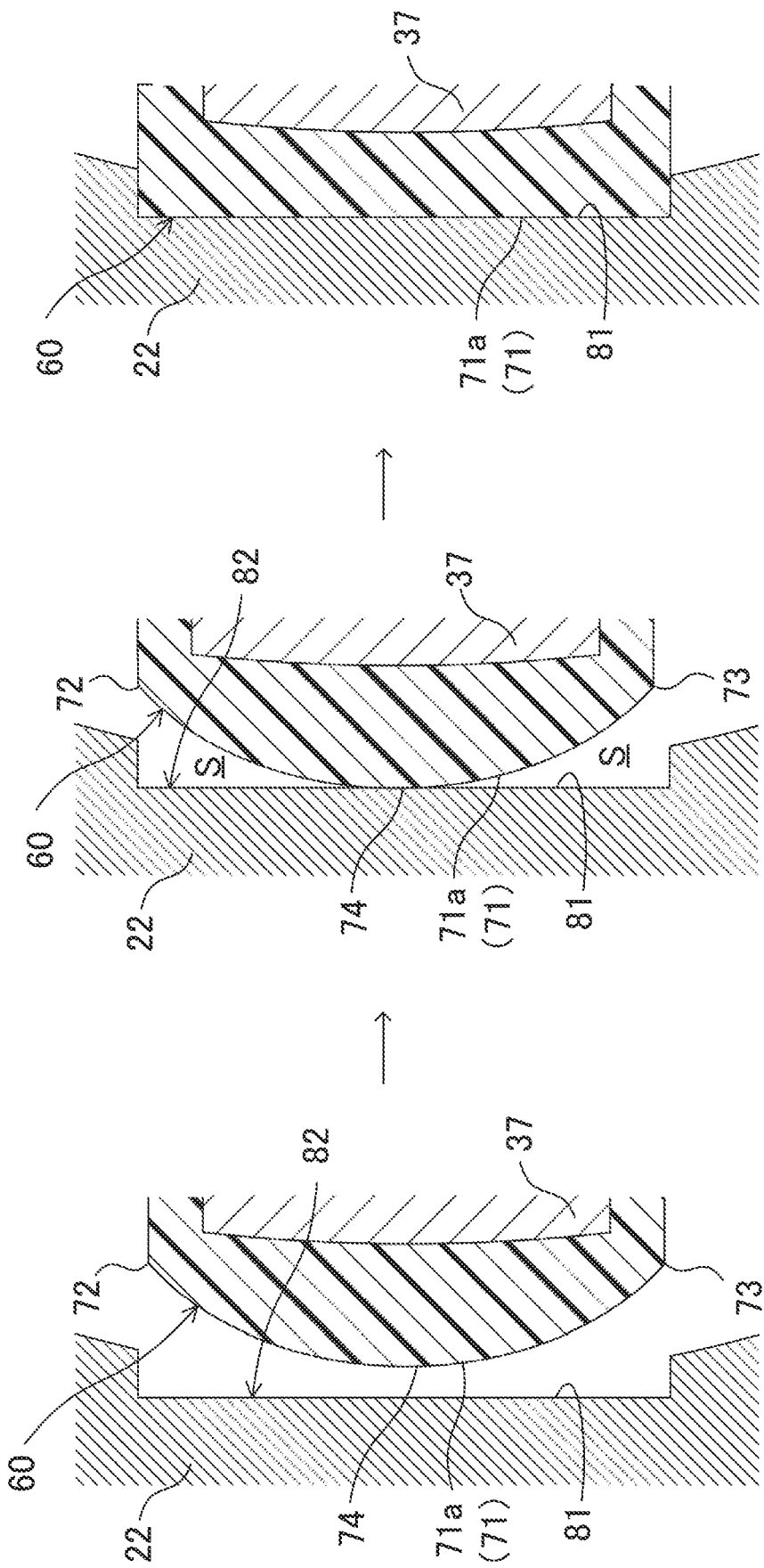

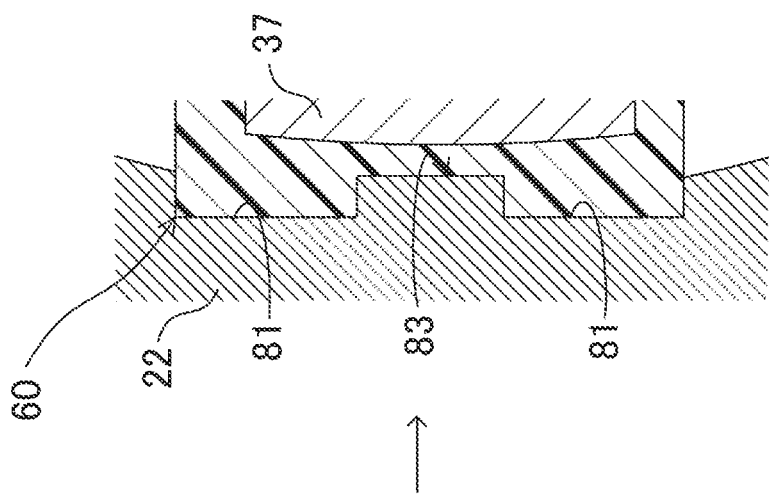
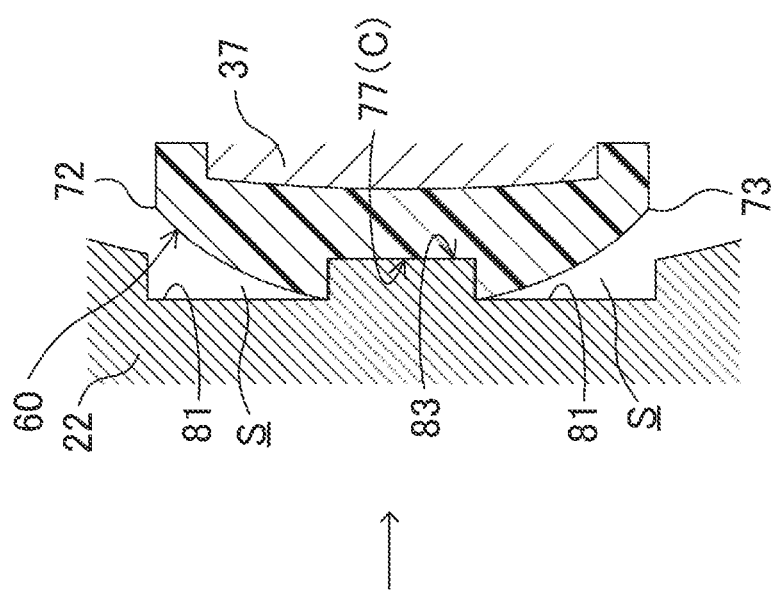
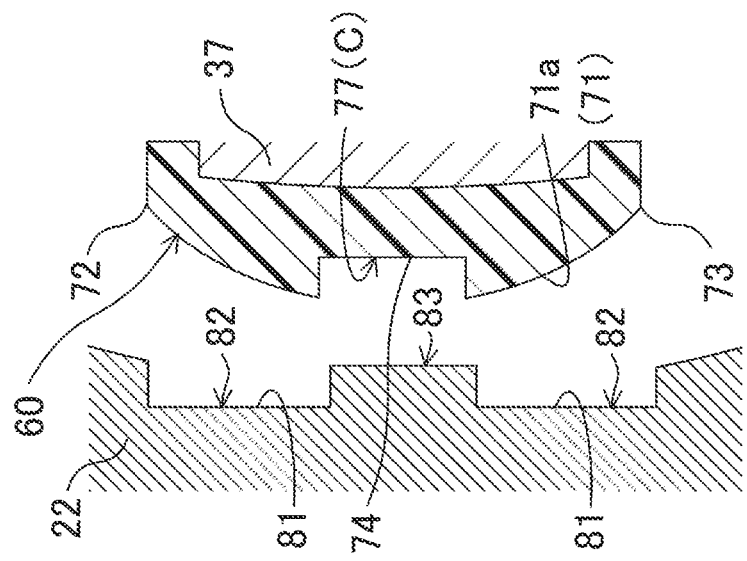

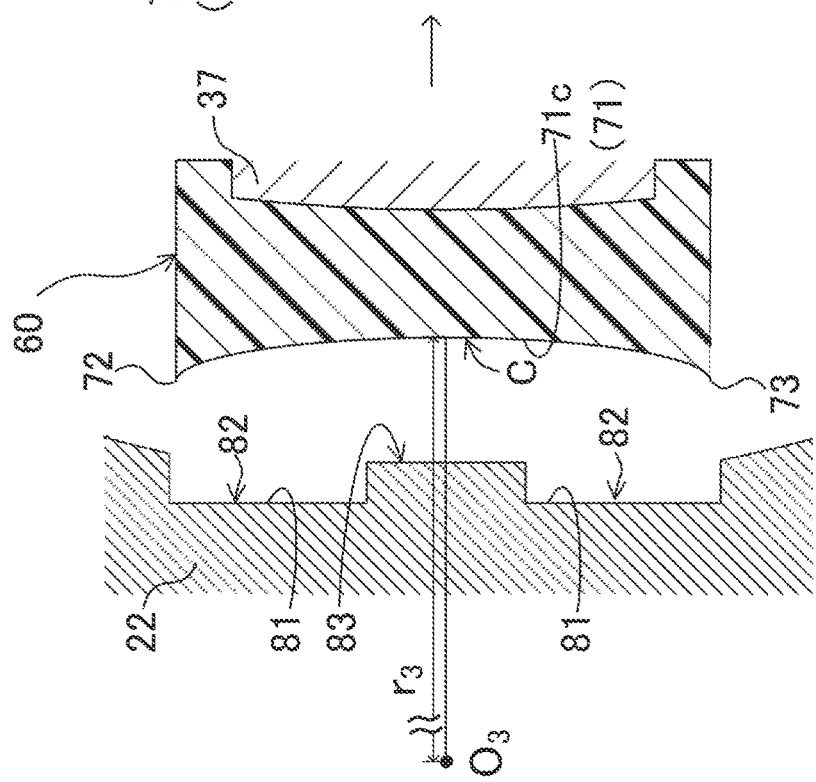

METHOD FOR MANUFACTURING COMPRESSOR

CROSS-REFERENCE TO RELATED APPLICATIONS

This is a continuation of International Application No. PCT/JP2022/022357 filed on Jun. 1, 2022, which claims priority to Japanese Patent Application No. 2021-132637, filed on Aug. 17, 2021. The entire disclosures of these applications are incorporated by reference herein.

BACKGROUND

Technical Field

The present disclosure relates to a method for manufacturing a compressor.

Background Art

In the compressor described in Japanese Unexamined Patent Publication No. 2001-289173, a resin member, which is a nonconductive material, is fixed to a space between a barrel of a casing and a stator core of an electric motor.

SUMMARY

A first aspect is directed to a method for manufacturing a compressor including a tubular barrel, a stator core, and a resin member provided on an outer peripheral surface of the stator core. The method for manufacturing the compressor includes fixing the stator core to an inside of the barrel via the resin member by shrink fit. An outer peripheral surface of the resin member is a first joining surface. A surface in contact with the first joining surface on an inner peripheral surface of the barrel is a second joining surface. The fixing the stator core to the inside of the barrel includes joining the first joining surface to the second joining surface. Upon joining, to the second joining surface, an intermediate portion of the first joining surface between a first end and a second end facing each other, spaces between the first joining surface and the second joining surface are formed between the first end and the intermediate portion and between the second end and the intermediate portion.

BRIEF DESCRIPTION OF THE DRAWINGS

FIG. 11A, FIG. 11B and FIG. 11C show a process of joining the first joining surface and the second joining surface in the method for manufacturing a compressor according to a second variation.

FIG. 12A, FIG. 12B and FIG. 12C show a process of joining the first joining surface and the second joining surface in the method for manufacturing a compressor according to a third variation.

FIG. 13A, FIG. 13B and FIG. 13C show a process of joining the first joining surface and the second joining surface in the method for manufacturing a compressor according to a fourth variation.

FIG. 14A, FIG. 14B and FIG. 14C show a process of joining the first joining surface and the second joining surface in the method for manufacturing a compressor according to a fifth variation.

FIG. 15A, FIG. 15B and FIG. 15C show a process of joining the first joining surface and the second joining surface in the method for manufacturing a compressor according to a sixth variation.

DETAILED DESCRIPTION OF EMBODIMENT(S)

Embodiments of the present disclosure will be described in detail below with reference to the drawings. The present disclosure is not limited to the embodiments shown below, and various changes can be made within the scope without departing from the technical concept of the present disclosure. Since each of the drawings is intended to illustrate the present disclosure conceptually, dimensions, ratios, or numbers may be exaggerated or simplified as necessary for the sake of ease of understanding.

A compressor (20) of the present disclosure is provided for a refrigeration apparatus (1).

(1) Overview of Refrigeration Apparatus

Figure 1:
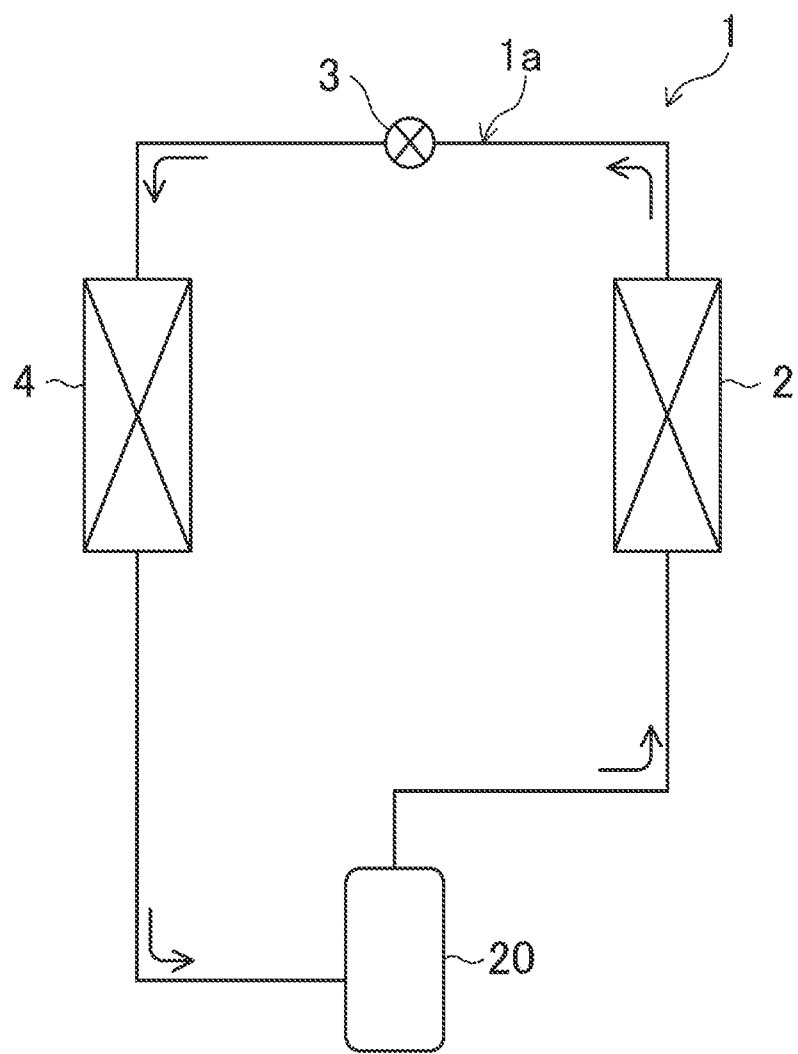
FIG. 1 is a schematic configuration diagram of a refrigeration apparatus according to an embodiment.

The refrigeration apparatus (1) shown in FIG. 1 includes the compressor (20) of the present disclosure. The refrigeration apparatus (1) has a refrigerant circuit (1a) filled with a refrigerant. The refrigerant circuit (1a) has a compressor (20), a radiator (2), a decompression mechanism (3), and an evaporator (4). The decompression mechanism (3) is an expansion valve. The refrigerant circuit (1a) performs a vapor compression refrigeration cycle.

In the refrigeration cycle, the refrigerant compressed by the compressor (20) dissipates heat to the air in the radiator (2). The refrigerant which has dissipated heat is decompressed by the decompression mechanism (3) and evaporates in the evaporator (4). The refrigerant which has evaporated is sucked into the compressor (20).

The refrigeration apparatus (1) is an air conditioner. The air conditioner may be any of a cooling-only apparatus, a heating-only apparatus, or an air conditioner which switches between cooling and heating. In such a case, the air conditioner has a switching mechanism (e.g., a four-way switching valve) which switches a direction in which the refrigerant circulates. The refrigeration apparatus (1) may be a water heater, a chiller unit, or a cooling apparatus which cools the air in an internal space. The cooling apparatus cools the air in an internal space of a refrigerator, a freezer, a container, or the like. The expansion mechanism is an electronic expansion valve, a temperature-sensitive expansion valve, an expander, or a capillary tube.

(2) Compressor

Figure 2:
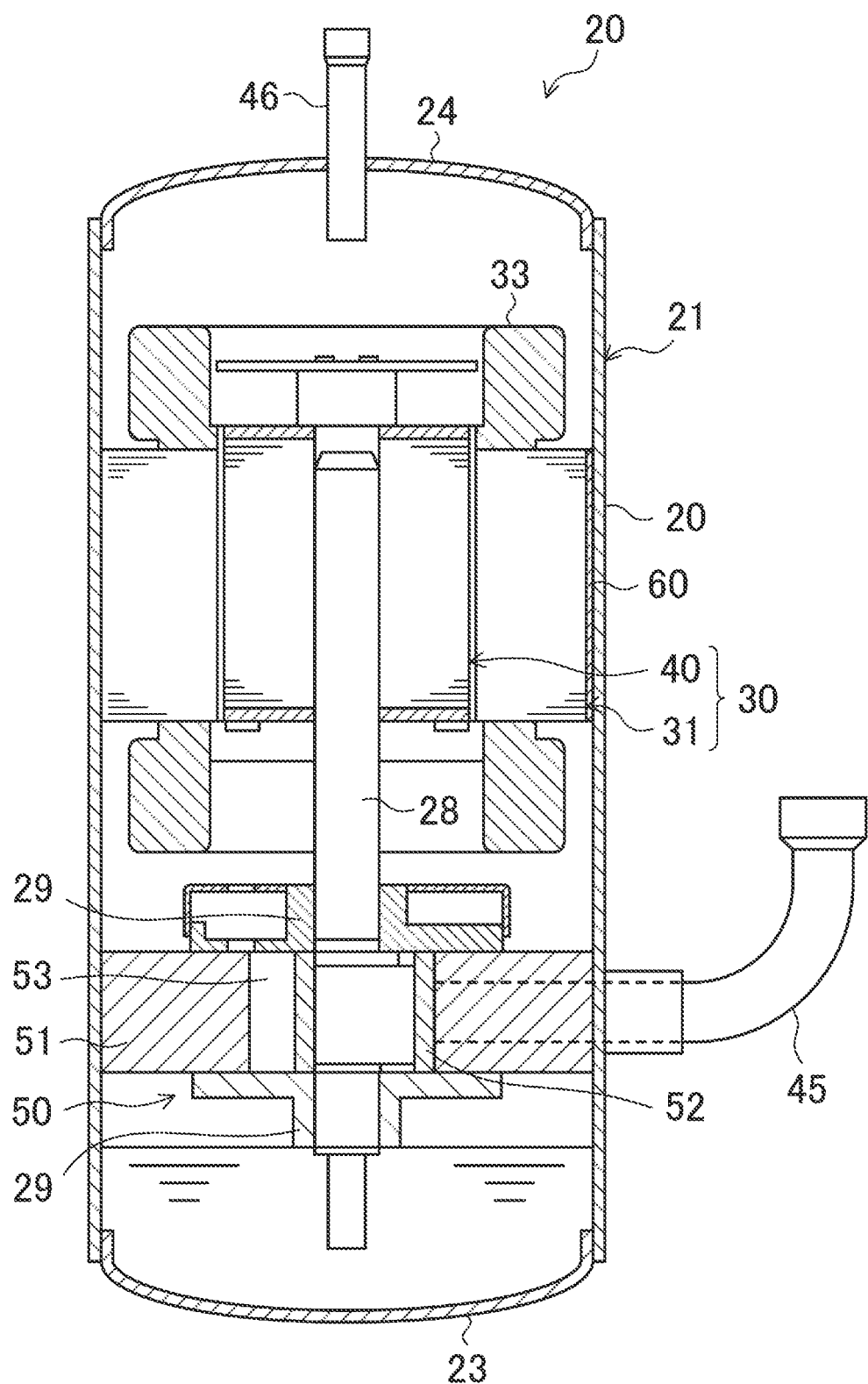
FIG. 2 is a vertical cross-sectional view of the compressor according to the embodiment.

As illustrated in FIG. 2, the compressor (20) is a rotary fluid machinery. The compressor (20) has a casing (21), an electric motor (30), a drive shaft (28), and a compression mechanism (50).

(2-1) Casing

The casing (21) houses the electric motor (30), the drive shaft (28), and the compression mechanism (50). The casing (21) is a hermetic container. The inside of the casing (21) is filled with a high-pressure refrigerant discharged from the compression mechanism (50).

The casing (21) is made of a metal material. The casing (21) has a barrel (22), a bottom portion (23), and a top portion (24). The barrel (22) is a cylindrical metal member. At each of both ends of the barrel (22) in the axial direction, an opening is formed. In this example, the axial direction of the barrel (22) corresponds to the vertical direction. The bottom portion (23) closes the lower opening of the barrel (22). The top portion (24) closes the upper opening of the barrel (22).

(2-2) Electric Motor

Figure 3:
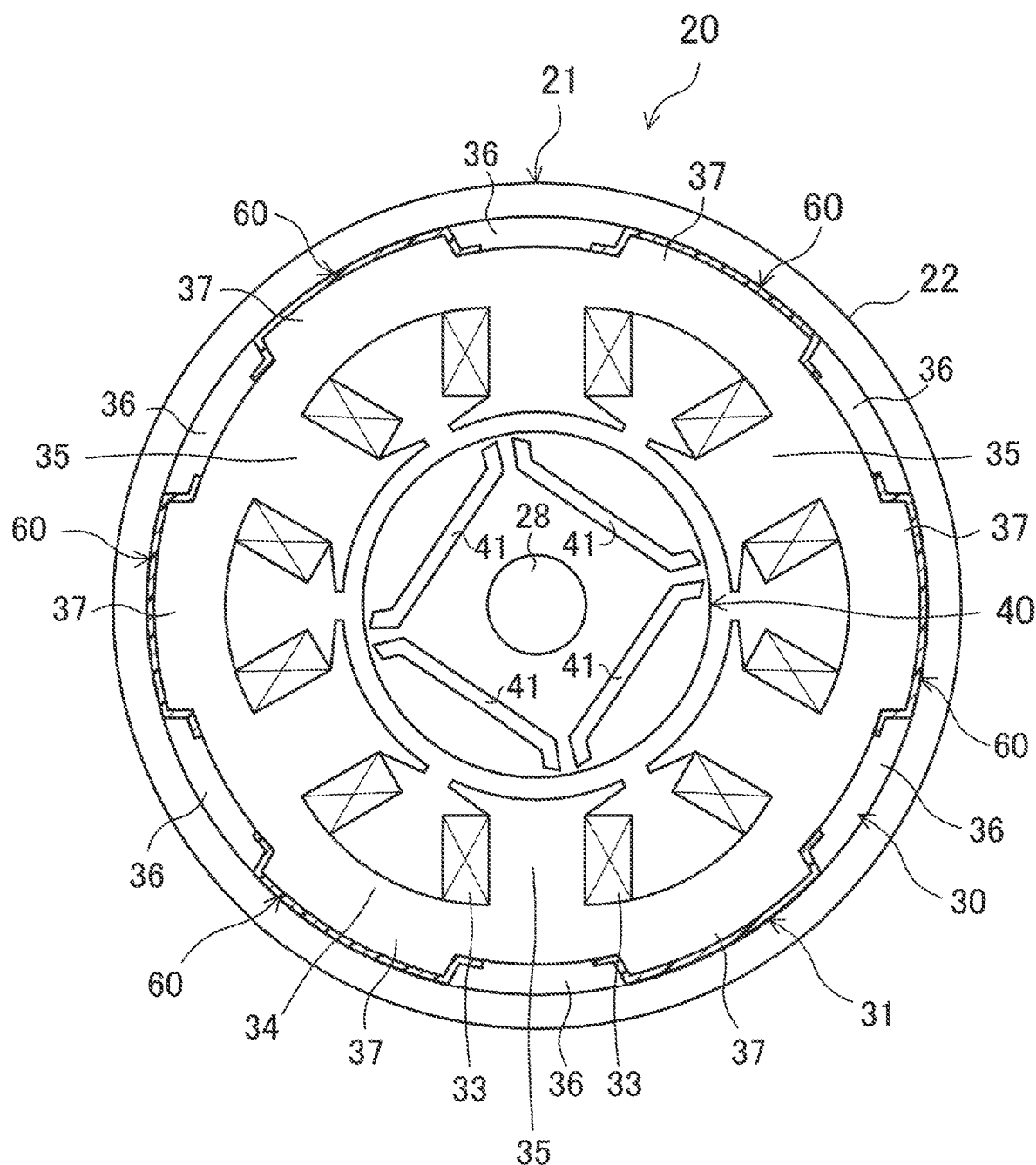
FIG. 3 is a horizontal cross-sectional view of an electric motor.

As illustrated in FIGS. 2 and 3, the electric motor (30) is arranged above the compression mechanism (50). The electric motor (30) has a stator (31) and a rotor (40). The stator (31) is supported by the barrel (22) of the casing (21). The fixing structure for the stator (31) will be described in detail later.

The stator (31) has a stator core (32) and a coil (33) wound around the stator core (32). The stator core (32) includes electrical steel sheets stacked in the axial direction. As illustrated in FIG. 3, the stator core (32) has an annular back yoke (34) and a plurality of (six in this example) teeth (35) extending radially inward from the inner peripheral surface of the back yoke (34).

The outer peripheral surface of the back yoke (34) has a plurality of (six in this example) core cuts (36). The core cuts (36) are grooves extending in the axial direction of the stator core (32). A protrusion (37) protruding radially outward is provided between adjacent core cuts (36). The stator core (32) of the present example is provided with six protrusions (37). Each of the protrusions (37) has a pair of side surfaces (37a) extending radially outward and an end surface (37b) provided between the side surfaces (37a) in pair. The protrusion (37) extends toward both ends in the axial direction of the stator core (32).

The rotor (40) is arranged inside the stator core (32). The drive shaft (28) is fixed in the axial center of the rotor (40). The rotor (40) is provided with a plurality of (four in this example) slots (41). A permanent magnet is embedded inside each of the slots (41).

The operation frequency of the electric motor (30) is controlled by an inverter device. In other words, the compressor (20) is an inverter compressor having a variable operation frequency.

(2-3) Drive Shaft

The drive shaft (28) extends vertically along the axial center of the casing (21). The drive shaft (28) is rotated by the electric motor (30). The drive shaft (28) is rotatably supported by a bearing (29).

(2-4) Compression Mechanism

The compression mechanism (50) has a cylinder (51) and a piston (52) provided inside the cylinder (51). A cylinder chamber (53) is formed between the inner peripheral surface of the cylinder (51) and the outer peripheral surface of the piston (52). In the cylinder chamber (53), a fluid is compressed by the piston (52) driven by the drive shaft (28).

(2-5) Suction Pipe and Discharge Pipe

The compressor (20) has a suction pipe (45) and a discharge pipe (46). The suction pipe (45) penetrates the barrel (22) in the radial direction and communicates with the cylinder chamber (53). A low-pressure refrigerant in the refrigerant circuit (1a) is sucked into the cylinder chamber (53) through the suction pipe (45). The discharge pipe (46) penetrates the top portion (24) in the axial direction and communicates with an internal space of the casing (21). The refrigerant compressed in the compression mechanism (50) flows through portions, such as the core cuts (36) of the electric motor (30), and is then sent to the refrigerant circuit (1a) through the discharge pipe (46).

(3) Fixing Structure of Stator

Hereinafter, the fixing structure of the stator (31) will be described in detail. The compressor (20) of the present embodiment has resin members (60) provided on the outer peripheral surface of the stator core (32).

(3-1) Resin Member

Figure 4:
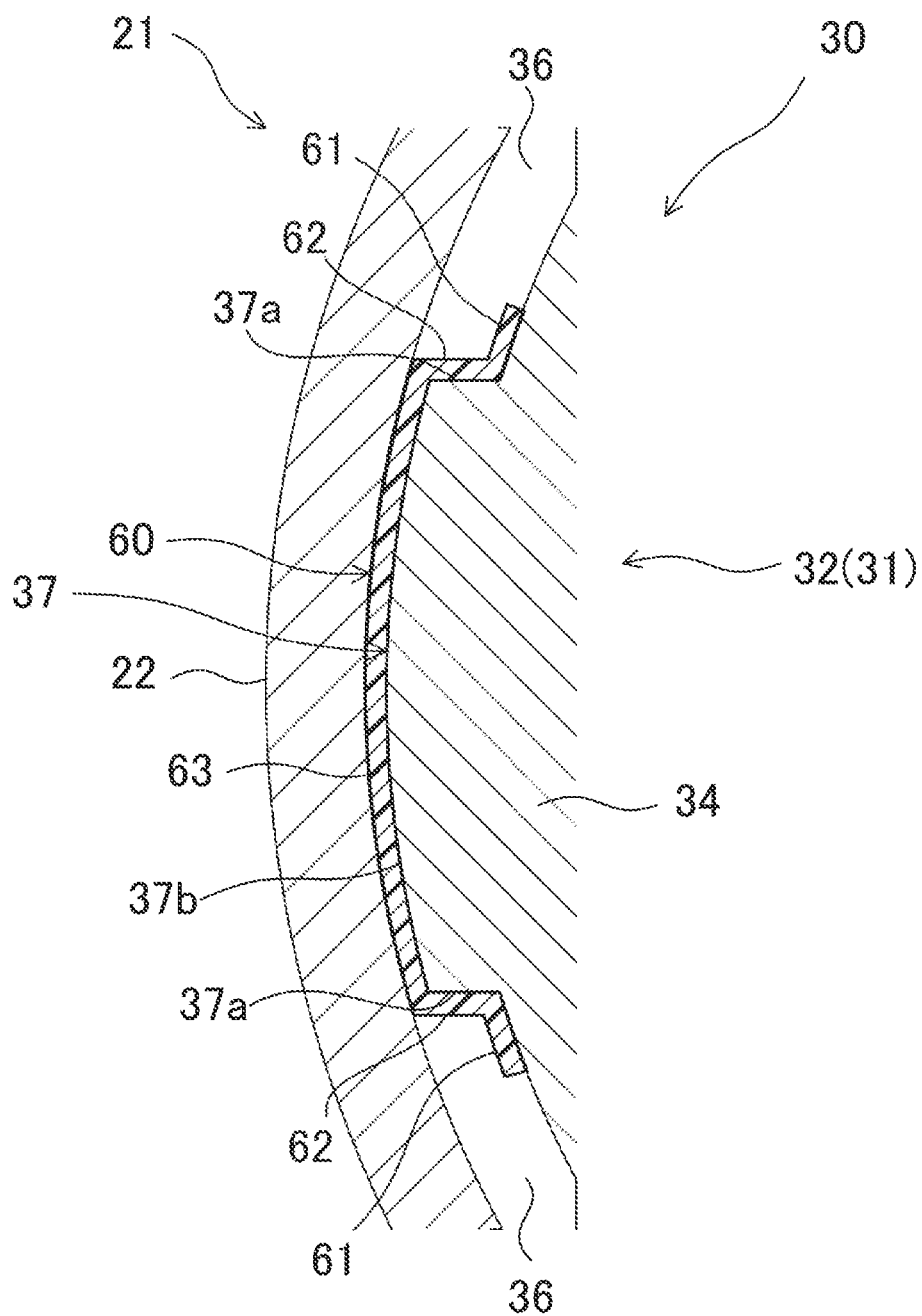
FIG. 4 is an enlarged view of a resin member of the electric motor and the periphery thereof in FIG. 3.

As illustrated in FIGS. 2 to 4, the compressor (20) has resin members (60). The resin members (60) are located at the respective positions corresponding to the protrusions (37) of the stator core (32). Thus, the number of resin members (60) is the same as the number of protrusions (37). For example, eight protrusions (37) may be provided for the outer peripheral surface of the stator core (32). In such a case, the compressor (20) has eight resin members (60) corresponding to the respective protrusions (37).

Each of the resin members (60) is made of an insulating material. The resin member (60) has a function of reducing propagation of electromagnetic noise of the electric motor (30) to the outside of the casing (21). The resin member (60) is made of, for example, polyphenylene sulfide (PPS). The resin member (60) may be a liquid crystal polymer (LCP). The resin member (60) may be a composite material in which PPS contains glass fibers.

The resin member (60) is fixed to the outer peripheral surface of the stator core (32). The resin member (60) extends toward both ends of the stator core (32) in the axial direction.

The resin member (60) covers the entire surface of the protrusion (37) of the stator core (32). The resin member (60) is made of a pair of bases (61), a pair of sidewalls (62), and a fixing portion (63) that are combined together.

The bases (61) in pair are provided on both sides of the base of the protrusion (37) on the outer peripheral surface of the back yoke (34). The bases (61) in pair extend along the outer peripheral surface of the back yoke (34).

Each of the sidewalls (62) in pair covers an associated side surface (37a) of the protrusion (37). The sidewalls (62) in pair extend in the direction in which the protrusion (37) protrudes.

The fixing portion (63) is continuous with radially outer ends of the sidewalls (62) in pair. The fixing portion (63) is arc-shaped along the inner peripheral surface of the barrel (22) in a cross section perpendicular to the axial direction of the barrel (22). The fixing portion (63) is located between the barrel (22) and the stator core (32).

As will be described in detail later, the resin member (60) is formed on the outer peripheral surface of the stator core (32) by insert molding.

(4) Method for Manufacturing Compressor

The method for manufacturing the compressor (20) will be described in detail below with reference to FIGS. 5 to 7. The method for manufacturing a compressor (20) includes shrink fitting of fixing the stator core (32) to the inside of the barrel (22) via the resin members (60) by shrink fit. The shrink fitting includes: insert molding, heating, and joining.

(4-1) Insert Molding

Figure 5:
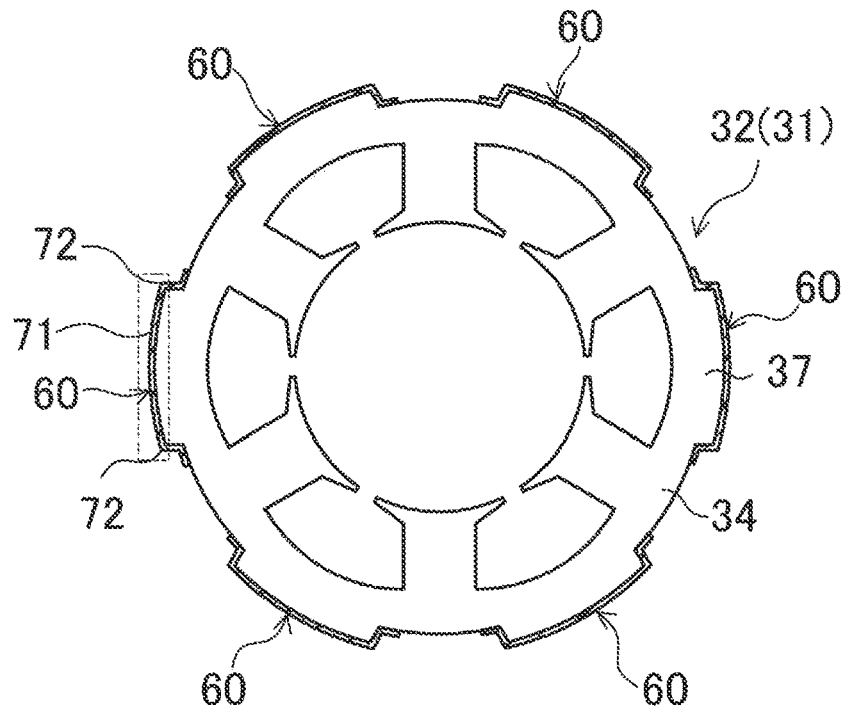
FIG. 5 is a horizontal cross-sectional view of a stator core during insert molding in the method for manufacturing the compressor according to the embodiment.

In the insert molding shown in FIG. 5, the resin members (60) are formed on the outer peripheral surface of the stator core (32) by insert molding to obtain a unit (U). The insert molding allows the resin members (60) to be easily formed on the outer peripheral surface of the stator core (32).

The shape of the outer peripheral surface of the fixing portion (63) of the resin member (60) formed on the outer peripheral surface of the stator core (32) will be described in detail below with reference to FIG. 6. The outer peripheral surface of the fixing portion (63) is a first joining surface (71) of the present disclosure. The first joining surface (71) has a first end (72) and a second end (73) facing each other. The first end (72) and the second end (73) face each other in the circumferential direction of the stator core (32). The first end (72) and the second end (73) are portions at which the fixing portion (63) is connected to the sidewalls (62). FIG. 6 shows a portion of the barrel (22) for description of the first joining surface (71).

In the insert molding, the first joining surface (71) is arc-shaped when viewed from above the stator core (32). In other words, the first joining surface (71) is arc-shaped in the circumferential direction of the stator core (32). Specifically, the first joining surface (71) has a first curved surface (71a) having a first curvature $1/r_1$. In this example, the first curved surface (71a) is formed on the entire first joining surface (71). The first curved surface (71a) may be formed on a part of the first joining surface (71). The $r_1$ is a curvature radius of the first curved surface (71a) centered around $O_1$. The $r_1$ is smaller than the radius of the stator core (32).

When the stator core (32) is viewed from above, a portion of the first joining surface (71) located at a center between the first end (72) and the second end (73) is an intermediate portion (74). The intermediate portion (74) is located at the outermost position of the first joining surface (71) in the radial direction of the stator core (32). In the circumferential direction of the first joining surface (71), the distance between the intermediate portion (74) and the first end (72) is substantially equal to the distance between the intermediate portion (74) and the second end (73). The first curved surface (71a) is formed in the intermediate portion (74) of the first joining surface (71) when formed in a part of the first joining surface (71).

Figure 6:
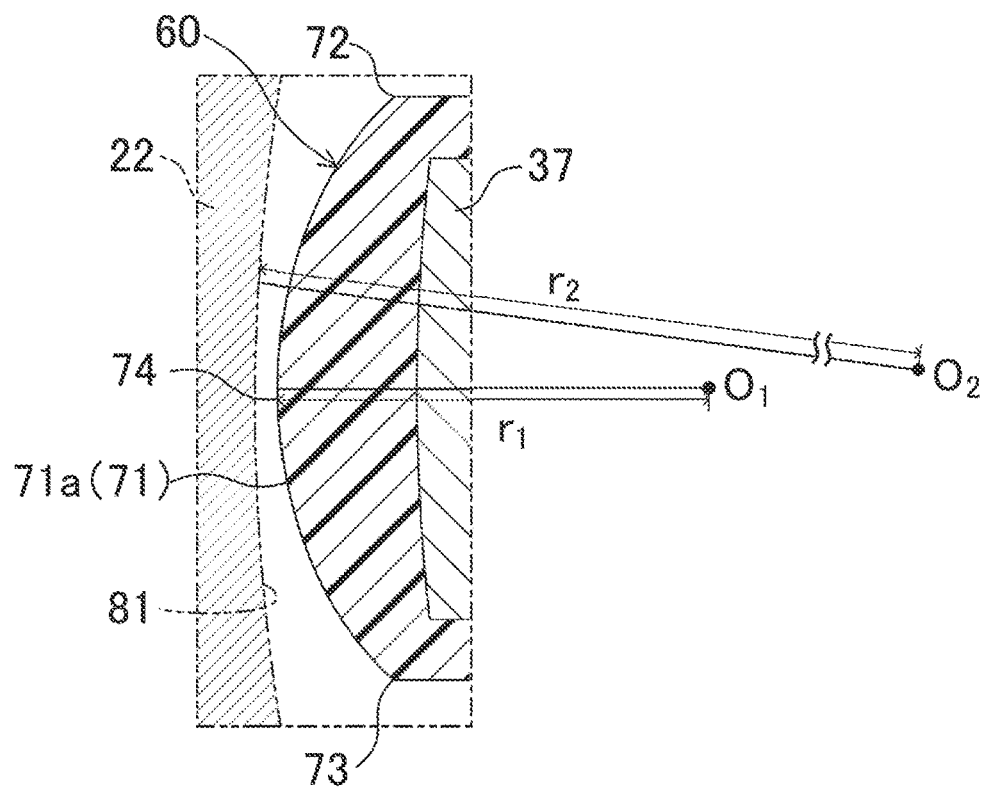
FIG. 6 is an enlarged view of a resin member of the stator core and the periphery thereof in FIG. 5.

As illustrated in FIG. 6, a portion of the inner peripheral surface of the barrel (22) in contact with the first joining surface (71) in the joining is a second joining surface (81). The second joining surface (81) has a second curvature $1/r_2$. The $r_2$ is a curvature radius of the second joining surface (81) centered around $O_2$. $O_2$ coincides with the axial center of the barrel (22). Thus, the $r_2$ is equal to the radius of the barrel (22). The first curvature $1/r_1$ is larger than the second curvature $1/r_2$ of the second joining surface (81).

(4-2) Heating

Figure 7:
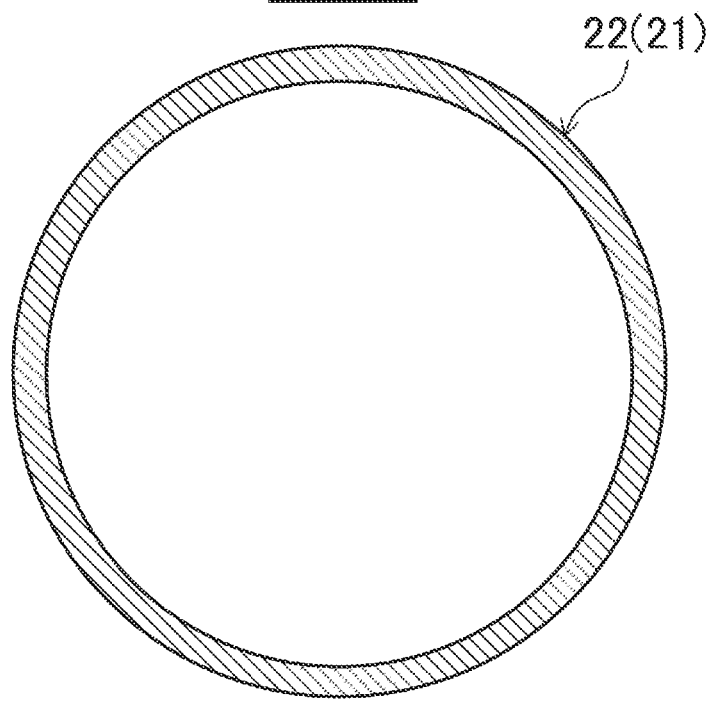
FIG. 7 is a horizontal cross-sectional view of a barrel during heating.

In the heating shown in FIG. 7, a tubular barrel (22) in the state in which the top portion (24) and the bottom portion (23) of the casing (21) are not fixed is used. In the heating, the barrel (22) of the casing (21) is heated. This causes thermal expansion of the barrel (22), and the diameters (the inner diameter and the outer diameter) of the barrel (22) increase.

(4-3) Joining

Figure 8:
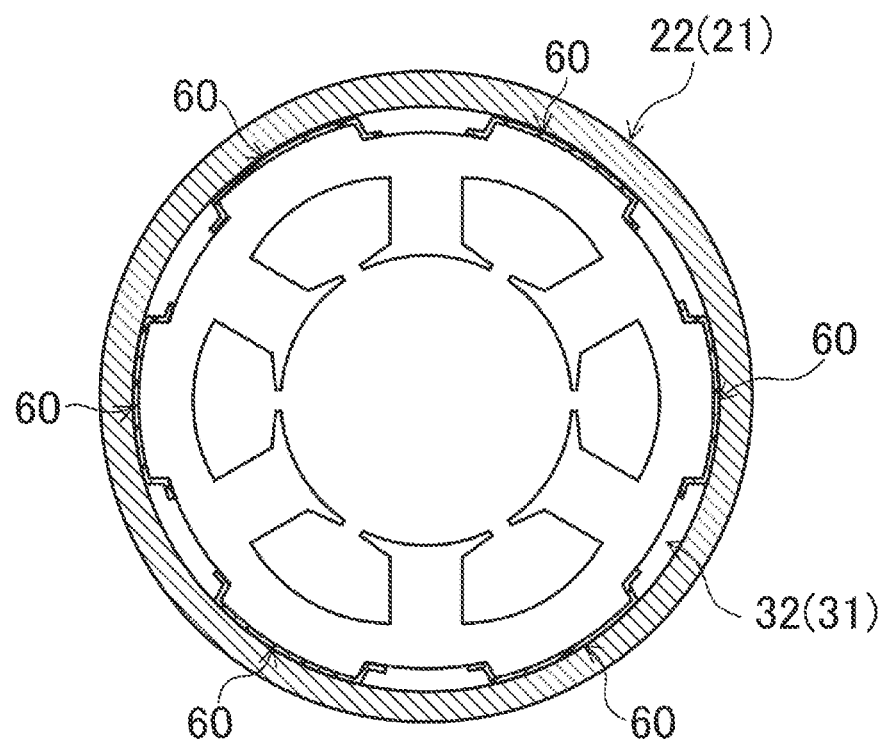
FIG. 8 is a horizontal cross-sectional view of a stator core during joining.

The joining is a first step of the present disclosure. In the joining shown in FIG. 8, an operator inserts the unit (U) into the barrel (22). The heating makes the diameter of the barrel (22) increase, so that the unit (U) is easily inserted into the barrel (22). In the joining, the inner diameter of the barrel (22) is reduced, so that the unit (U) is fitted into the barrel (22). In other words, the unit (U) is fixed to the inside of the barrel (22) by shrink fit.

Figure 9A:
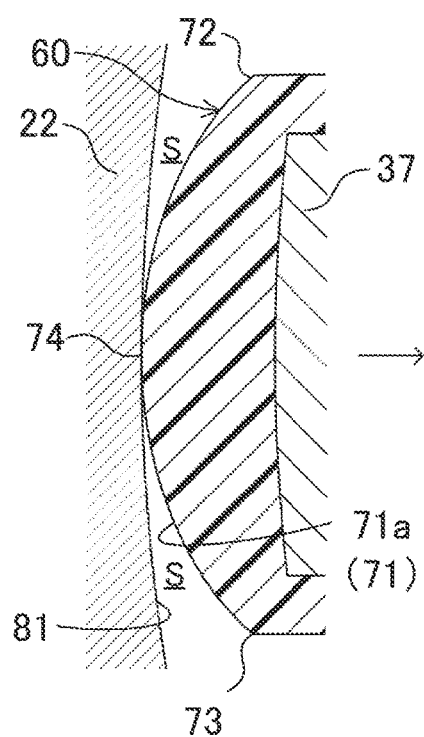
FIG. 9A, FIG. 9B and FIG. 9C show a process of joining a first joining surface and a second joining surface by a method for manufacturing the compressor according to the embodiment.

The process of joining the first joining surface (71) to the second joining surface (81) will be described below with reference to FIG. 9A, FIG. 9B and FIG. 9C. In the process of reducing the inner diameter of the barrel (22), first, the intermediate portion (74) of the first joining surface (71) of the resin member (60) comes into contact with the second joining surface (81) (FIG. 9A). At this time, spaces (S) are formed between the first joining surface (71) and the second joining surface (81) when the unit (U) and the barrel (22) are viewed from above. Specifically, the spaces (S) are formed between the first end (72) and the intermediate portion (74) and between the second end (73) and the intermediate portion (74).

Figure 9B:
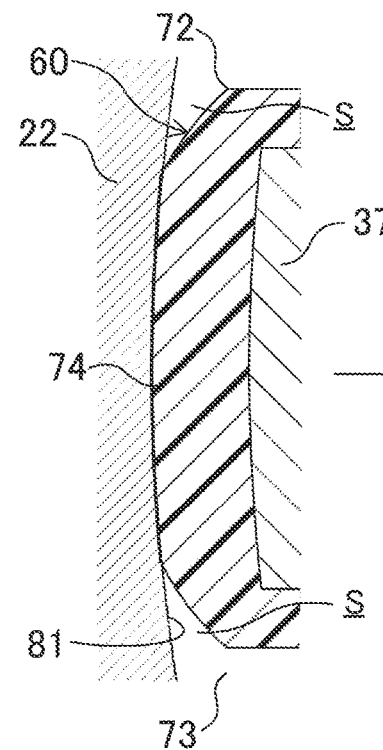
Figure 9C:
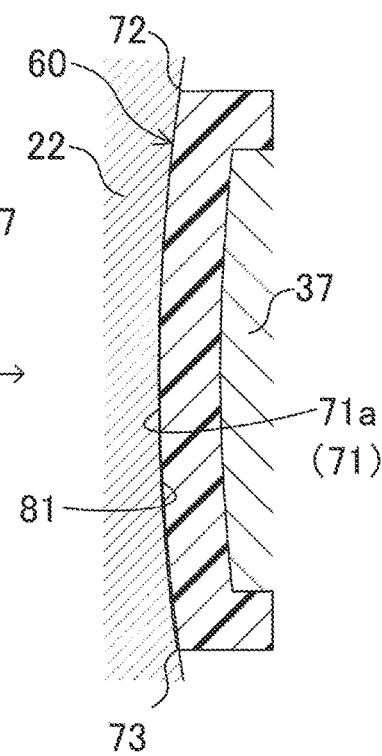

The resin member (60) is first melted in the intermediate portion (74), and then gradually melted from the intermediate portion (74) toward the first end (72) and the second end (73) in the circumferential direction (FIG. 9B). Thereafter, the inner diameter of the barrel (22) decreases, so that the resin member (60) is gradually melted toward the first end (72) and the second end (73). Thus, the spaces (S) are gradually filled with the melted resin member (60). In this way, the joining area between the first joining surface (71) and the second joining surface (81) gradually increases, and eventually, the entire surface of the first joining surface (71) is joined to the second joining surface (81). If the first curvature is equal to the second curvature, the entire surface of the first joining surface (71) comes into contact with the second joining surface (81) all at once during the process of reducing the inner diameter of the barrel (22). Then, the resin member (60) on the entire surface of the first joining surface (71) melts, and the resin member (60) melted in the vicinities of the first end (72) and the second end (73) protrude from the first joining surface (71) and the second joining surface (81), thereby forming burrs. However, in this example, the melted resin member (60) flows toward the first end (72) and the second end (73) so as to gradually fill the spaces (S) therewith, thereby reducing protrusion of the resin member (60) from the first joining surface (71) and the second joining surface (81) (FIG. 9C). As a result, generation of burrs of the resin member (60) can be securely reduced.

(5) Features (5-1)

In the joining of the method for manufacturing the compressor (20) of the present embodiment, spaces (S) are formed between the first joining surface (71) and the second joining surface (81) upon contact of the intermediate portion (74) of the first joining surface (71) of the resin member (60) with the second joining surface (81) on the inner peripheral surface of the barrel (22). The spaces (S) are formed between the first end (72) and the intermediate portion (74) in the first joining surface (71) and between the second end (73) and the intermediate portion (74) in the first joining surface (71).

The spaces (S) are formed on both sides of the intermediate portion (74), and thus, the spaces (S) are gradually filled with the melted resin member (60) from the intermediate portion (74) toward the first end (72) and the second end (73). This reduces protrusion of the resin member (60) from the first end (72) and the second end (73) as mentioned above, compared to the case in which the entire surface of the first joining surface (71) comes into contact with the second joining surface (81) all at once. As a result, generation of burrs of the protruded resin member (60) can be reduced, and failures in the compressor (20) and the refrigeration apparatus (1) including the compressor (20) can be reduced.

(5-2)

In the method for manufacturing the compressor (20) of the present embodiment, the first end (72) and the second end (73) in the first joining surface (71) face each other in the circumferential direction of the stator core (32). This reduces protrusion of the resin member (60) in the circumferential direction of the first joining surface (71) and the second joining surface (81).

(5-3)

In the method for manufacturing the compressor (20) according to the embodiment, the first joining surface (71) has a first curved surface (71a) having a first curvature. The first curvature is larger than a second curvature of the second joining surface (81). This allows the intermediate portion (74) of the first curved surface (71a) to first come into contact with the second joining surface (81), thereby forming spaces (S).

(6) Variations

The above embodiment may be implemented as the following variations. In the following description, differences from the embodiment will be described in principle.

(6-1) First Variation: First Variation of First Joining Surface

Figure 10:
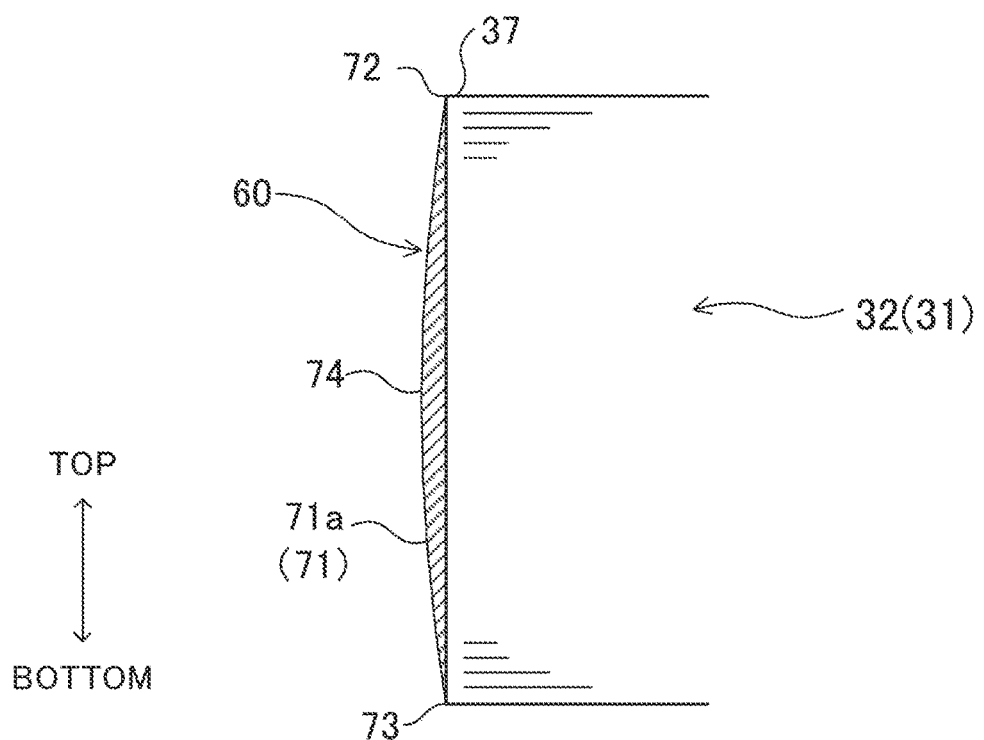
FIG. 10 is a vertical cross-sectional view of a resin member of a stator core and the periphery thereof during insert molding in the method for manufacturing a compressor according to a first variation.

As illustrated in FIG. 10, the resin member (60) insert-molded in this variation is formed such that the vertical cross section of the first joining surface (71) is arc-shaped. In other words, the first joining surface (71) of this variation is arc-shaped in the axial direction of the barrel (22). The first end (72) and the second end (73) face each other in the axial direction of the stator core (32). Specifically, the first end (72) is located at the upper end of the first joining surface (71), and the second end (73) is located at the lower end of the first joining surface (71). In such a case, the intermediate portion (74) is located between the first end (72) and the second end (73). The intermediate portion (74) extends in the circumferential direction of the first joining surface (71).

When the intermediate portion (74) comes into contact with the second joining surface (81) in the joining, spaces (S) are formed in the top-bottom direction with the intermediate portion (74) interposed therebetween. As the first joining surface (71) approaches the second joining surface (81), the melted resin member (60) fills the spaces (S) in the top-bottom direction. This allows reduction in protrusion of the melted resin member (60) from the first end (72) and the second end (73). Since the first end (72) and the second end (73) are located at the upper and lower ends of the first joining surface (71), protrusion of the resin member (60) from the upper and lower ends of the stator core (32) due to the first joining surface (71) of this variation is reduced. This can reduce generation of burrs at the upper and lower ends of the stator core (32).

In this variation, the first end (72) and the second end (73) may be provided in the circumferential direction as well as in the top-bottom direction of the first joining surface (71). In such a case, the intermediate portion (74) is located at the center of the first joining surface (71). With such a configuration, when the intermediate portion (74) comes into contact with the second joining surface (81) during joining, spaces (S) are formed in the top-bottom direction and the circumferential direction with the intermediate portion (74) interposed therebetween. This reduces protrusion of the melted resin member (60) not only in the top-bottom direction but also in the circumferential direction of the first joining surface (71), thereby reducing generation of burrs from the top-bottom and circumferential directions of the first joining surface (71).

(6-2) Second Variation: Second Variation of First Joining Surface

As illustrated in FIG. 11A, the first joining surface (71) of this variation has a first convex portion (75) protruding radially outward of the stator core (32). The first convex portion (75) is located at a center portion of the first joining surface (71) in the circumferential direction and extends in the top-bottom direction of the first joining surface (71). The intermediate portion (74) is located at the distal end of the first convex portion (75). The first joining surface (71) of this variation has a first curvature $1/r_1$ larger than a second curvature $1/r_2$ as in the embodiment.

When the distal end (the intermediate portion (74)) of the first convex portion (75) comes into contact with the second joining surface (81) during the joining, a space (S) is formed on each side of the first convex portion (75) in the circumferential direction (FIG. 11B). In this way, also in this variation, the melted resin member (60) fills the spaces (S) toward the first end (72) and the second end (73) as the first joining surface (71) approaches the second joining surface (81) (FIG. 11B). This reduces protrusion of the melted resin member (60) from the first end (72) and the second end (73), thereby reducing generation of burrs (FIG. 11C).

(6-3) Third Variation: Third Variation of First Joining Surface

As illustrated in FIG. 12A, the first joining surface (71) of this variation has a first recess (76a) and a second recess (76b). The first recess (76a) is formed between the first end (72) and the intermediate portion (74). The second recess (76b) is formed between the second end (73) and the intermediate portion (74). The first recess (76a) and the second recess (76b) extend in the top-bottom direction of the first joining surface (71). The first joining surface (71) of this variation has a first curvature $1/r_1$ larger than a second curvature $1/r_2$ as in the embodiment.

When the intermediate portion (74) comes into contact with the second joining surface (81) in the joining, a space (S) is formed on each side of the intermediate portion (74) in the circumferential direction. The melted resin member (60) fills the spaces (S) toward the first end (72) and the second end (73) as the inner diameter of the barrel (22) decreases. In this process, the melted resin member (60) flows into the first recess (76a) and the second recess (76b) (FIG. 12B). This reliably reduces protrusion of the melted resin member (60) from the first end (72) and the second end (73). This reduces generation of burrs of the resin member (60) (FIG. 12C).

(6-4) Fourth Variation: First Variation of Second Joining Surface

As illustrated in FIG. 13A, the inner peripheral surface of the barrel (22) of this variation has a groove (82) recessed radially outward. The second joining surface (81) of this variation is a bottom surface of the groove (82). The groove (82) extends in the axial direction (the top-bottom direction) of the barrel (22). The first joining surface (71) has a first curvature $1/r_1$ larger than a second curvature $1/r_2$ as in the embodiment.

Upon contact of the intermediate portion (74) with the second joining surface (81) in the joining, a space (S) is formed on each side of the intermediate portion (74) in the circumferential direction (FIG. 13B). The melted resin member (60) fills the spaces (S) toward the first end (72) and the second end (73) as the inner diameter of the barrel (22) decreases. Thereafter, the first end (72) and the second end (73) come into contact with the second joining surface (81) inside the groove (82), thereby reducing protrusion of the melted resin member (60) from the groove (82) (FIG. 13C). This reduces generation of burrs of the resin member (60).

(6-5) Fifth Variation: First Variation of First Joining Surface and Second Joining Surface As illustrated in FIG. 14A, the inner peripheral surface of the barrel (22) of this variation has grooves (82) recessed radially outward as in Fourth Variation. A second protrusion (83) protruding radially inward of the barrel (22) is formed in the grooves (82). The second joining surface (81) of this variation includes the bottom surfaces of the grooves (82) and the second protrusion (83).

The first joining surface (71) of this variation has a plane structure (C). The plane structure (C) is formed during insert molding. Due to the plane structure (C), spaces (S) are formed in the grooves (82) upon contact of the intermediate portion (74) with the second protrusion (83) in the joining. The plane structure (C) of this variation includes a third recess (77). The third recess (77) is formed such that the second protrusion (83) is fitted into the third recess (77) during joining. The third recess (77) extends in the top-bottom direction. The third recess (77) is located between the first end (72) and the second end (73). The intermediate portion (74) is located inside the third recess (77). The first joining surface (71) of this variation has a curved surface having a first curvature similar to that in the embodiment and the third recess (77). The curved surface having the first curvature and the third recess (77) are formed during the insert molding.

During the joining, the second protrusion (83) of the second joining surface (81) is fitted into the third recess (77) of the first joining surface (71) (FIG. 14B). The intermediate portion (74) of this variation is the inner surface of the third recess (77). This allows formation of spaces (S) inside the grooves (82). The melted resin member (60) fills the spaces (S) toward the first end (72) and the second end (73) as the inner diameter of the barrel (22) decreases. The spaces (S) are formed inside the grooves (82). This reduces protrusion of the melted resin member (60) from the grooves (82). In addition, the second protrusion (83) is fitted into the third recess (77). This substantially prevents the first joining surface (71) from being displaced from the second joining surface (81) during the joining. Further, the second joining surface (81) has the grooves (82) and the second protrusion (83). This increases the fixing force to the resin member (60) as compared with the case in which the second joining surface (81) is flat. This substantially prevents the stator core (32) from being displaced inside the barrel (22) even when the rotor (40) is driven.

(6-6) Sixth Variation: Second Variation of First Joining Surface and Second Joining Surface As illustrated in FIG. 15A, the plane structure (C) of this variation is a third curved surface (71c) having a third curvature $1/r_3$ as viewed from above the stator core (32). The center of curvature of the third curvature $1/r_3$ is located outside the stator core (32). The third curved surface (71c) of this variation is formed on the entire first joining surface (71). Thus, $r_3$ is a curvature radius of the first joining surface (71) of this variation. The third curved surface (71c) may be formed in a part of the first joining surface (71). In the joining, the first joining surface (71) is set to come into contact with the second protrusion (83), and the first end (72) and the second end (73) are set to come into contact with the second joining surface (81).

Upon contact of the first joining surface (71) with the second protrusion (83) in the joining, the first end (72) and the second end (73) come into contact with the second joining surface (81) (FIG. 15B). Specifically, the first joining surface (71) comes into contact with both ends of the top portion of the second protrusion (83). Portions of the first joining surface (71) in contact with both ends of the top portion are intermediate portions (74). Spaces (S) are formed between the intermediate portion (74) and the first end (72) and between the intermediate portion (74) and the second end (73).

The spaces (S) are filled with the resin member (60) as the inner diameter of the barrel (22) decreases. Since the spaces (S) are formed inside the grooves (82), and the first end (72) and the second end (73) are in contact with the bottom surfaces of the grooves (82) (the second joining surface (81)), protrusion of the melted resin member (60) from the grooves (82) is reduced (FIG. 15C).

(7) Other Embodiments

The embodiment and variations may also be configured as follows.

The intermediate portion (74) only needs to be located between the first end (72) and the second end (73), and needs not to be centered between the first end (72) and the second end (73).

In Second Variation, during the joining, spaces (S) only need to be formed when the intermediate portion (74) of the first joining surface (71) comes into contact with the second joining surface (81), and the first curved surface (71a) needs not to be formed. For example, the first joining surface (71) may have a radius which is equal to the first curvature radius $r_2$.

In Fourth Variation, the bottom surface of the groove (82) (the second joining surface (81)) needs not to be flat. The second curvature of the second joining surface (81) only needs to be smaller than the first curvature.

While the embodiment and variations thereof have been described above, it will be understood that various changes in form and details may be made without departing from the spirit and scope of the claims. The embodiment, the variation thereof, and the other embodiments may be combined and replaced with each other without deteriorating intended functions of the present disclosure.

The ordinal numbers such as "first," "second," "third," . . . , described above are used to distinguish the terms to which these expressions are given, and do not limit the number and order of the terms.

As can be seen from the foregoing description, the present disclosure is useful for a method for manufacturing a compressor.

The invention claimed is:

1. A method for manufacturing a compressor including a tubular barrel, a stator core, and a resin member provided on an outer peripheral surface of the stator core, the method comprising:

fixing the stator core to an inside of the barrel via the resin member by shrink fit,
an outer peripheral surface of the resin member being a first joining surface and a surface in contact with the first joining surface on an inner peripheral surface of the barrel being a second joining surface, and
the fixing the stator core to the inside of the barrel including
joining the first joining surface to the second joining surface, and
upon joining, to the second joining surface, an intermediate portion of the first joining surface between a first end and a second end facing each other, spaces between the first joining surface and the second joining surface being formed
between the first end and the intermediate portion and
between the second end and the intermediate portion.

2. The method of claim 1, wherein
the first end and the second end face each other in a circumferential direction of the stator core.

3. The method of claim 1, wherein
the first end and the second end face each other in an axial direction of the stator core.

4. The method of claim 1, wherein
the first joining surface has a first curved surface having a first curvature,
the intermediate portion is located in the first curved surface, and
the first curvature is larger than a second curvature of the second joining surface.

5. The method of claim 1, wherein
the first joining surface has a first convex portion protruding radially outward of the stator core, and
the intermediate portion is located in the first convex portion.

6. The method of claim 1, wherein
the first joining surface has
a first recess formed between the first end and the intermediate portion, and
a second recess formed between the second end and the intermediate portion.

7. The method of claim 1, wherein
the inner peripheral surface of the barrel has a groove recessed radially outward, and
the second joining surface is a bottom surface of the groove.

8. The method of claim 7, wherein
the second joining surface has a protrusion protruding radially inward of the barrel, and
the first joining surface has a plane structure by which the spaces are formed inside the groove upon contact of the intermediate portion with the protrusion in the joining.

9. The method of claim 8, wherein
the plane structure has a third recess into which the protrusion is fitted in the joining.

10. The method of claim 8, wherein
the plane structure includes a third curved surface having a third curvature centered on a point outside the stator core.

* * * * *